United States Patent [19]

Fagerburg et al.

[11] Patent Number: 4,945,155
[45] Date of Patent: Jul. 31, 1990

[54] PREPARATION OF LOW COLOR COPOLY(ARYLENE SULFIDE) BY HEATING COPOLY(ARYLENE SULFIDE)

[75] Inventors: David R. Fagerburg; Mark Rule; Joseph J. Watkins; Paul B. Lawrence, all of Kingsport, Tenn.

[73] Assignee: Eastman Kodak Company, Rochester, N.Y.

[21] Appl. No.: 350,668

[22] Filed: May 11, 1989

[51] Int. Cl.$^5$ ............................................. C08G 75/16
[52] U.S. Cl. .................................... 528/480; 528/388; 528/389; 528/481
[58] Field of Search ................ 528/480, 481, 388, 389

[56] References Cited

U.S. PATENT DOCUMENTS 3,354,129 11/1967 Edmond et al. ...................... 528/388
4,098,776 7/1978 Tieszen et al. ....................... 528/481
4,786,713 11/1988 Rule et al. ............................ 528/389

*Primary Examiner*—Harold D. Anderson
*Attorney, Agent, or Firm*—Charles R. Martin; William P. Heath, Jr.

[57] ABSTRACT

A process comprising heating for a sufficient period of time and at a temperature in the range of the glass transition temperature of the polymer to 5 degrees C below the melting point of the polymer, a solid, comminuted, copoly(arylene sulfide) prepared by reacting at a polymer producing temperature a mixture of a diiodoaromatic compound and elemental sulfur which contains less than 0.05 weight percent carbon, the copoly(arylene sulfide) corresponding to the structure

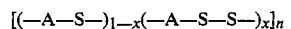
$$[(-A-S-)_{1-x}(-A-S-S-)_x]_n$$

wherein A is a divalent substituted or unsubstituted aromatic radical, x is in the range of 0.2 to 0.005 and n is at least 100.

12 Claims, No Drawings

PREPARATION OF LOW COLOR COPOLY(ARYLENE SULFIDE) BY HEATING COPOLY(ARYLENE SULFIDE)

This invention relates to a process for the preparation of a copoly(arylene sulfide) of exceptionally low color by heating a solid, comminuted copoly(arylene sulfide). The copoly(arylene sulfide) is prepared by reacting a diiodoaromatic compound and elemental sulphur which contains less than 0.05 weight percent carbon.

Poly(arylene sulfide) (PAS) resins are thermosetting-thermoplastic polymeric materials with good thermal stability, unusual insolubility, resistance to chemical environments and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) (PPS) is a commercial product which is generally produced by reacting p-dichlorobenzene with sodium sulfide in a polar organic solvent to produce PPS and the by-product sodium chloride. This process is known as the Edmonds-Hill polymerization procedure and the basic process is disclosed in U.S. 3,354,129. An improvement on the Macallum polymerization procedure involves adding N-haloamides as catalysts in the procedure. The Edmonds-Hill polymerization utilizes only chloroaromatic compounds.

Ser. No. 312,289 discloses a process for preparation of a copoly(arylene sulfide) wherein elemental sulfur is reacted with diiodobenzene. U.S. Pat. No. 4,786,713 discloses the copoly(arylene sulfide) resulting from this process.

Ser. No. 350,668 discloses a process for producing a copoly(arylene sulfide) having enhanced color using sulfurs having less than 0.05 weight carbon.

Although the process disclosed in Ser. No. 350,668 can be used to prepare a very desireable polymer the color of the polymer could be improved.

We have now discovered that the color of the polymer prepared following the disclosure of Ser. No. 350,668 can be materially improved by heating the copoly(arylene sulfide) in the form of comminuted particles.

Broadly the process of this invention comprises heating for a sufficient period of time and at a temperature in the range of the glass transition temperature of the polymer to 5 degrees C below the melting point of the polymer, a solid, comminuted, copoly(arylene sulfide) prepared by reacting at a polymer producing temperature a mixture of a diiodoaromatic compound and elemental sulfur which contains less that 0.05 weight percent carbon, the copoly(arylene sulfide) corresponding the structure

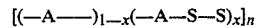

wherein A is a divalent substituted or unsubstituted aromatic radical, x is in the range of 0.2 to 0.005 and n is at least 100.

The copoly(arylene sulfide) of the general type used in this invention is broadly known in the art and disclosed in U.S. Pat. No. 4,786,713 and Ser. No. 312,289 incorporated herein by reference. The specific copoly(arylene sulfide) useful in this invention is disclosed in Ser. No. 350,668, incorporated herein by reference.

The vast majority of units in the copolymer useful in this invention are the (—A—S—) unit and the number of (—A—S—S—) or disulfide units are small compared to the number of (—A—S—) units. Generally, the fraction of (-A-S-S-) units is in the range of 0.5 to 0.001, based on the combined number of both (—A—S—) and (—A—S—S—) units. Thus, the copolymer prepared by the process of the invention can be represented as

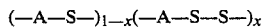

where x is in the range of 0.5 to 0.001. The sequence of (—A—S—) and (—A—S—S—) units is though to be random throughout the molecular chain. The (—A—S—) units are defined as the amount of sulfur per A ring in excess of 1.0.

The size of the polymer chain can conveniently be expressed as the total number of each kind of unit in the chain. Therefore, the coply(arylene sulfide) prepared by the process of this invention can be more specifically expressed as corresponding to the structure

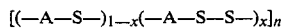

wherein n, the degree of polymerization, is at least 100, preferably at least 200 and more preferably in the range of 200 to 5,000 as determined by melt viscosity measurement at 300° C. The degree of polymeriztion when A is p-phenylene can be calculated using the relationship $\log(n) = 1.473 + 0.2873 \times \log$ (melt viscosity) where melt viscosity is measured in poise.

In the process used to prepare the copoly(arylene sulfide) a diiodoarylene compound corresponding to the structure

where A is a divalent arylene radical is reacted with elemental sulfure to produce a substantially linear copoly(arylene sulfide) having both (—A—S—) units and (—A—S—S—) units.

Diiodoaromatic compounds which can be utilized in the present process include unsubstituted or substituted aromatics which have two iodine substitutes. Suitable diiodoaraomatic compounds include hydrocarbon aromatics, nitrogen-containing aromatics, sulfur-containing aromatics and oxygen-containing aromatics. Typical hydrocarbon aromatics include benzene, biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, diphenyl ether, benzophenone, etc. Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiooaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, and 2,6-diiodonaphthalene. P,p'-diiodobenzophenone, p-diiodobenzene, p,p'-diiodobiphenyl, and p,p'-diiododiphenyl ether are most preferred.

The diiodoaromatic starting materials of the present invention may be prepared by an suitable process. For example, the diiodoaromatic compounds may be prepared by standard liquid or gas phase iodination reactions.

Sulfur is reacted as elemental sulfur and may consist of any of the standard forms which are possible for elemental sulfur. That is, the sulfur may be present in any of its allotropic modification such as orthorhombic cyclooctasulfur ($S_8$) or any other cyclic elemental sulfur such as any of the cyclosulfur species having 6–12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98–100%, although sulfur having a lower degree of purity may be used. This lack of sensitivity to the presence of impurities in the sulfur is advantageous to the present process when used as a commercial process since highly purified sulfur is not required and the associated expense is not incurred.

The carbon content of the sulfur used to prepare the copoly(arylene sulfide) is quite low. Specifically, the amount of carbon is less than 0.05, preferably less than 0.025 and more preferably less than 0.01 weight percent, based on the weight of the sulfur.

In the process of the present invention sulfur reacts with a diiodoaromatic compound, eliminating elemental iodine and forming the PAS as shown below.

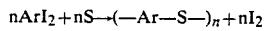

$$nArI_2 + nS \rightarrow (-Ar-S-)_n + nI_2$$

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization.

The polyerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfure, one might use benzene, toluene or naphthalene as a solvent.

The polymerization reaction is generally conducted at a temperature above about 175° C. Although the reaction may be conducted at temperatures below 175° C., the polymerization reaction is much slower. There is no particular upper temperature limit on the polymeriztion reaction, which may be conducted at any temperature below the decomposition temperature of the diiodoaromatic compound. For most polymeriztion reactions, temperatures in the range of about 175°–400° C. will be suitable, although for particular diiodoaromatic compounds temperatures in excess of 400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodoaromatic compund, the engineeering requirements of the process, and the specific molecular weight, viscosity and physical properties of the desired product.

The polymerization reaction may be carried out in a batch reaction vessel or may be carried out as a semi-continuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfure being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The copoly(arylene sulfide) used in this invention can be optionally terminated with mono functional aromatic groups. Example of compounds which contribute a monovalent radical which terminates the polymer chain includes mono iodobenzene, monoiodo biphenyl, monoiodo diphenyl ether, monoiodo diphenyl sulfone and monoiodo diphenyl sulfide.

Once the copoly(arylene sulfide) has been prepared in accordance within the above disclosure it must be commented into particles. This can be accomplished by conventional means such as a Wiley Mill, which has rotating blades working against fixed blades or a conventional micropulverizing of apparatus which has rotating hammers. The micropulverizing method is preferred for its ability to produce smaller particle sizes. During the particle size reduction, cooling may be employed to render the polymer more brittle. Liquid nitrogen is often employed as coolant for this process.

In order to obtain the execptionally low color copoly(arylene sulfide) of this invention the polymer must be of a sufficiently small particle size. In general, the particles may not be any larger than about those which will pass through a 30 mesh screen and preferrably should be small enough to pass thorough a 60 mesh screen and more preferrably through a 100 mesh screen corresponding to ASTM U.S. Standard Sieve Series.

The time and temperature used to treat the conventional copoly(arylene sulfide) are inter related and also vary depending upon the particle size of the copoly(arylene sulfide). In general, this process will not function in a satisfactory manner if the temperature of treatment is below the glass transition temperature of the copoly(arylene sulfide) and the treatment temperature should be at least 5 degrees above the glass transition temperature. The upper temperature limit of the process is determined by the melting point of the polymer. In general, the process should not be conducted at any higher than within 10° C. of the melting point of the polymer. For the case of poly(phenylene sulfide), for example, the lower temperature limit is about 100° C. and the upper temperature limit is around 270° C.

The minimum time of treatment for the process is 5 min and at temperatures below 150° C., the minimum treatment time is more preferrably 60 min for particles that can pass through a 200 mesh screen. The maximum time of treatment is not important but for economices of operation it will be less than 24 hr and more prefereably will be less than 12 hrs and even more preferrably less than 6 hrs.

Treatment time can also be regarded as a function of particle size and can be calculated by well known relationships on diffusion of materials in a straightforward manner using as an estimated diffusion constant for iodine $1 \times 10^{-8}$ and ratioing the time restrictions as stated above which are meant to specifically apply to particles passing through a 200 mesh screen when treated at 240° C. Thus, larger particles will require correspondingly longer times to allow for iodine diffusion. Thus, for particles which can only pass through a 30 mesh screen, the minimum treatment time is defined by the following equations:
at temperatures from Tg+10° C. to Tg+50° C.:

$$t = 3 \times 10^{8} * r^2$$

where t is the time in seconds and r is the particle radius in cm.
at temperatures form greater than 50° above Tg:

$$t = 2 \times 10^{7} * r^2$$

where the same definitions hold as above.

The polymers of this invention can be optionally mixed with inorganic fillers such as fiberglass, mica, talc, wollastonite, etc. or combinations thereof to yield molded articles having a higher modulus and heat distoration temperature than without the filler. Permissable levels of these fillers range from 5 to about 60 wt% based on the total compounded weight of polymer plus filler. Fiberglass is a particularly preferred filler and can be obtained in many grades commercially. One particularly advantageous fiberglass grade is grade 497-DB fiberglass from Owens-Corning Company. Compounding of this inorganic filler can be accomplished in any convenient manner such as extrusion of a physical blend of the fiberglass and the polymer granules. The excelent color is retained in this process of compounding.

The copolymer produced by the process of this invention is useful for preparation of varous shaped articles such as pellets, fibers and molded articles. The polymer can be prepared into these shaped articles by conventional processes, such as injection molding and melt spinning.

EXAMPLE 1

This example illustrates practice of the process of the invention.

Into 1 500 ml 3-neck round bottom flask are weighed the following: 32.0 g sulfur (0.998 mol), 410 g p-diiodobenzene (1.24 mol, 24.5 mol% excess), and 6.4 g of 4-iodobiphenyl. The flask was fitted with a 350 Vigreux column, a mechanical stirrer through the center joint, and an inlet tube for a slow air sweep. The column was atached via a distillatioon head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 0.5 hr and then reduced to 60 torr where it was held for an additional 30 min. The pressure was then reduced to 30 torr for 30 min followed by application of vacuum to a pressure of 0.5 torr and the bath temperature was raised to 250° C. After holding there for 1.5 hr, the reaction flask was removed from the metal bath, repressurized with nitrogen, and allowed to cool under nitrogen. The polymer was crystalline with a low melt viscosity. Solid state polymerizion for 24 hr at 240° C. under a nitrogen sweep of 1.0 ft$^3$/ hr, gave a tough material with a medium yellow color when pressed into films at 300° C.

Next the copoly(arylene sulfide) was micropulverized using liquid nitrogen as a coolant in a micromill, and the powder sieved to pass a 200 mesh screen. Seven and three tenths grams of this powder is placed in a glass tube with an inlet tube near its bottom delivering 1.0 ft$^3$/hr nitrogen flow. The tube is placed in a heated aluminum block at 260° C. After 24 hr, the tube was removed. The resultant polyemr was a very light tan color. A pressed film of the polymer was tough and very light in color showing almost no signs of yellowness.

EXAMPLE 2

This example illustrates the embodiment of the invention wherein the copoly(arylene sulfide) is terminated.

Example 1 was repeated except 3.21 g of 4-iodobephenyl was added to the reaction as a terminator. The copoly(arylene sulfide) was yellow in color. The copoly(arylene sulfide) was micropulverized and seived through a 200 mesh seive. One gram of this powder was heated under nitrogen flow at 240° C. for 10 minutes. A pressed film was quite tough and had less yellow color than before the heat treatment.

We claim:

1. A process comprising heating for a minimum of 5 minutes and at a temperature in the range of the glass transition temperature of the polymer to 5 degrees C. below the melting point of the polymer, a solid, comminuted, copoly(arylene sulfide) prepared by reacting at a polymer producing temperature a mixture of a diiodoaromatic compound and elemental sulfur which contains less than 0.05 weight percent sulfur which contains less than 0.05 weight percent carbon, the copoly(arylene sulfide) corresponding to the structure $$[(-A-S-)_{1-x}(-A-S-S-)_x]_n$$

wherein A is a divalent substituted or unsubstituted aromatic radical, x is in the range of 0.2 to 0.005 and n is at least 100.

2. The process of claim 1 wherein the diiodoaromatic compound is selected from the group consisting of hydrocarbon aromatic, sulfur-containing aromatic, nitrogen-containing aromatic and oxygen-containing aromatic.

3. The process of claim 1 wherein the diiodoaromatic compound is selected from the group consisting of diiodobenzenes, diiodonaphthalenes, diiodobiphenyls, diiodotoluenes, diiodophenyl sulfones, and diiodobenzophenones.

4. The process of claim 1, wherein the diiodoaromatic compound is p-diiodobenzene, m-diiodobenzene, p,p'-diiodobiphenyl, p,p'-diiododiphenyl ether, 2,6-diiodonaphthalene, (p-iodophenyl) sulfone, and 4,4'-diiodobenzophenone.

5. The process of claim 1 wherein the polymer producing temperature is in the range of about 175°–400° C.

6. The process of claim 5 wherein the polymer producing temperature is in the range of 180°–350° C.

7. The process of claim 1 wherein the amount of carbon in the elemental sulfur is less than 0.025 weight percent.

8. The process of claim 7 wherein the amount of carbon in the elemental sulfur is less than 0.01 weight percent.

9. The process of claim 1 wherein the time for the heating step is at least 5 minutes.

10. The process of claim 9 wherein the time for the heating step is for at least 6 hours.

11. The process of claim 1 wherein the temperature for the heating step is in the range of 10 degrees C. above the glass transition temperature of the copoly(arylene sulfide) to 10 degrees C. below the melting point of the copoly(arylene sulfide).

12. A process comprising heating for a period of time of at least 6 hours and at a temperature in the range of 100°–270° C., a solid, comminuted, copoly(phenylene sulfide) prepared by reacting at a temperature in the range of 180°–350° C. a mixture of p-diiodobiphenyl and elemental sulfur which contains less than 0.01 weight percent carbon, the copoly(arylene sulfide) corresponding to the structure $$[(-A-S-)_{1-x}(-A-S-S-)_x]_n$$

wherein A is a divalent phenylene radical, x is in the range of 0.6 to 0.005, and n is at least 100.

* * * * *